United States Patent [19]
Le Deit et al.

[11] Patent Number: 5,515,951
[45] Date of Patent: May 14, 1996

[54] ELASTICALLY RETURNED SLIDING DISK BRAKE

[75] Inventors: Gerard Le Deit, Courtry; Jean Louis Gerard, Bagnolet, both of France

[73] Assignee: AlliedSignal Europe Services Techniques, Drancy, France

[21] Appl. No.: 140,193

[22] PCT Filed: Oct. 29, 1993

[86] PCT No.: PCT/FR93/01066

§ 371 Date: Nov. 4, 1993

§ 102(e) Date: Nov. 4, 1993

[87] PCT Pub. No.: WO94/12804

PCT Pub. Date: Sep. 9, 1994

[30] Foreign Application Priority Data

Nov. 26, 1992 [FR] France ................... 92 14207

[51] Int. Cl.$^6$ ................................ F16D 65/40
[52] U.S. Cl. ................... 188/73.38; 188/73.44
[58] Field of Search ................ 188/73.38, 73.39, 188/73.44, 73.45

[56] References Cited

U.S. PATENT DOCUMENTS

| | | | |
|---|---|---|---|
| 4,225,017 | 9/1980 | Op Den Camp | 188/73.38 |
| 4,552,253 | 11/1985 | Burgdorf et al. | 188/73.38 |
| 4,567,968 | 2/1986 | Denree | 188/73.45 X |
| 4,905,796 | 3/1990 | Schonenberger et al. | 188/73.38 X |
| 4,936,422 | 6/1990 | Mery et al. | 188/73.38 |

*Primary Examiner*—Robert J. Oberleitner
*Assistant Examiner*—Kevin D. Rutherford
*Attorney, Agent, or Firm*—Larry J. Palguta; Leo H. McCormick, Jr.

[57] ABSTRACT

A disk brake having a yoke having a caliper mounted on a carrier by a guide pin. A spring having a filiform structure with a first end connected to an arch of the caliper and a second end connected to the yoke. The first end of the spring engages the yoke such that as the caliper slides with respect to the yoke during actuation of the brake, the end acts on the caliper to return the caliper to a rest position on termination of the actuation of the brake.

3 Claims, 1 Drawing Sheet

ELASTICALLY RETURNED SLIDING DISK BRAKE

The present invention relates to a disk brake, comprising: a yoke; a carrier securely fastened to the yoke; a caliper securely fastened to a brake motor, having a concave arch directed towards the inside of the yoke, mounted to pivot about the carrier with respect to the yoke, and capable, when the brake motor is actuated, of sliding along the carrier in a first direction; first and second housings of common axis parallel to the carrier and distant from the latter, these housings being respectively formed in the yoke and in the caliper; a guide pin inserted axially into the two housings with, in at least one of the housings, a clearance allowing residual pivoting of the caliper with respect to the yoke; and a filiform spring exerting, between the caliper and the yoke, an elastic spacing force opposing this residual pivoting.

Brakes of this type have been used for many years on a great number of vehicles, and the U.S. Pat. No. 4,936,422 gives an example of a disk brake with a sliding caliper and single carrier which forms the context of application of the present invention.

A problem traditionally encountered in the design and production of this type of brake is that of returning the caliper to its rest position after actuation.

Indeed, if the caliper does not return to its rest position after having applied the friction members to the disk, the friction members may continue to rub on the disk, even in the absence of a significant brake torque and as a result noise and wear can be generated.

It is therefore necessary to provide means capable of returning the caliper back into a desired rest position after actuation, this necessity is difficult to satisfy, particularly owing to the fact that this rest position varies with the state of wear of the friction members.

In this context, the object of the present invention is to provide means which are simple and inexpensive but nevertheless capable to ensure the return of the caliper to a desired rest position.

To this end, the disk brake of the invention is essentially characterized in that a spring is wound round the guide pin and has a first strand bearing on the yoke and a second strand bearing on the arch of the caliper. The second strand bears on the arch via an end distant from the common axis and points in a direction or actuation direction of the caliper substantially opposite the first direction.

Preferably, the end of the second strand of the spring is partially directed in a direction substantially opposite the end in which the concavity of the arch is directed.

Moreover, the first strand of the spring advantageously connects two zones of the length of the spring in which the springs is wound on the guide pin, so as to ensure good stability of the spring on this guide pin.

Other features and advantages of the invention will emerge clearly from the description hereinafter provided while viewing the appended drawings.

Figure 1:
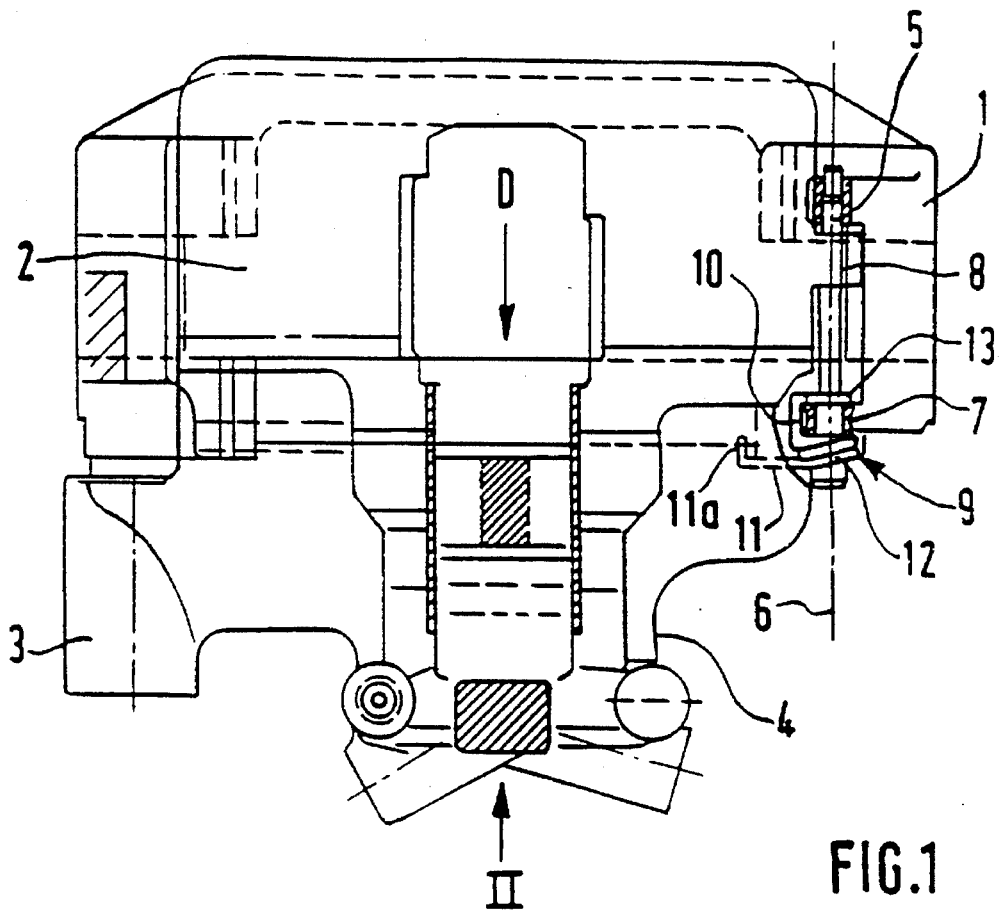
FIG. 1 is a plan view of a brake in accordance with the invention.

The disk brake represented in these figures comprises a yoke 1 and a caliper 2 mounted so as to slide on this yoke by means of an axial carrier 3.

A hydraulic brake motor 4 securely fastened to the caliper 2 is capable of applying to a disk (not shown), securely fastened to a wheel of a vehicle to be braked, two friction members (not shown) mounted on the yoke by means of support plates bearing on stops 1a, 1b.

The yoke 1 and the caliper 2, which are capable of pivoting with respect to each other about the carrier 3 forming the hinge, are rotationally securely fastened to each other by means of a guide pin 5 engaged along an axis 6 in at least one housing 7 in the yoke 1 and a housing 8 in the caliper 2.

Whilst the clearance of the guide pin 5 in the first housing 7 is infimal, the clearance of this guide pin in the housing 8 of the caliper is relatively large so as in particular to take up the manufacturing tolerances of the brake and its deformation under stress.

Under these conditions, it is known to provide a spring, such as 9, capable of exerting, between the caliper and the yoke, an elastic spacing force creating, between these components, a pivoting torque about the carrier 3, and urging the housing 8 into abutment against the guide pin 5.

According to the invention, the spring 9, of filiform structure, is wound round the guide pin 5 and has a first strand 10 bearing on the yoke and a second strand 11 bearing on the arch 2a of the caliper 2.

More precisely, the second strand 11 bears on the arch 2a via an end 11a which is at a distance from the axis 6 of the guide pin 5 and which points in a direction substantially opposite the direction D in which the caliper slides with respect to the yoke when the brake motor 4 is actuated.

Figure 2:
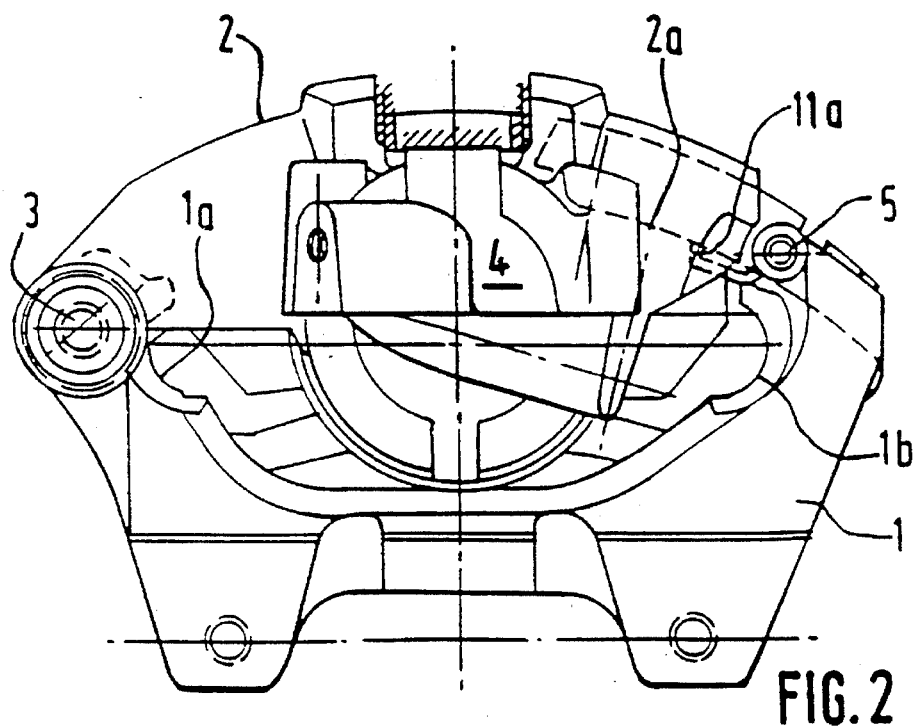
FIG. 2 is a front view of this brake observed in the direction of the arrow II of FIG. 1.

Moreover, the end 11a of the second strand 11 of this spring 9 is preferably also partially directed in a direction substantially opposite the one in which the concavity of the arch 2a is directed, that is to say slightly upwards as shown in FIG. 2, so as to be able easily to fasten onto the surface of the arch.

The first strand 10 of the spring 9 is, for its part, preferably provided between two zones 12 and 13 of the length of the spring 9 in which the latter is wound on the guide pin 5, so as to ensure good holding of the spring on this guide pin.

We claim:

1. A disk brake comprising: a yoke; a carrier fastened securely to the yoke; a caliper securely fastened to a brake motor, said caliper having a concave arch directed towards the inside of the yoke, said caliper being mounted to pivot about the carder with respect to the yoke, said caliper being capable during actuation of said brake motor of sliding from a rest position in a first direction along the carrier toward engagement with a brake member; first and second housings of common axis parallel to and distant from said carrier, said first and second housings being formed in said yoke and in said caliper, respectively; a guide pin inserted axially into said first and second housings with a clearance in at least one of said first and second housings allowing residual pivoting of said caliper with respect to said yoke; and a filiform spring exerting, between the caliper and the yoke, an elastic spacing force opposing said residual pivoting characterized in that said spring is wound round said guide pin and has a first strand bearing on the yoke and a second strand bearing on the arch of the caliper, and the second strand bearing on the arch through an end distant from the common axis and pointing in a direction substantially opposite the first direction to ensure the return of said caliper to said rest position.

2. The disk brake according to claim 1, characterized in that the end of the second strand of the spring is partially directed in a direction substantially opposite the direction in which the concavity of the arch is directed.

3. The disk brake according to claim 1, characterized in that the first strand connects two zones of the length of the spring wound on the guide pin.

* * * * *